(12) United States Patent
Fellenstein et al.

(10) Patent No.: US 7,062,536 B2
(45) Date of Patent: Jun. 13, 2006

(54) GROUPING ELECTRONIC REPLY MESSAGES

(75) Inventors: Craig Fellenstein, Brookfield, CT (US); Carl Phillip Gusler, Austin, TX (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 10/268,288

(22) Filed: Oct. 10, 2002

(65) Prior Publication Data

US 2004/0073616 A1    Apr. 15, 2004

(51) Int. Cl.
*G06F 13/00* (2006.01)

(52) U.S. Cl. ............................ 709/206; 709/217
(58) Field of Classification Search ........ 709/200–203, 709/206, 217, 218–220, 227
See application file for complete search history.

(56) References Cited

U.S. PATENT DOCUMENTS

| | | | | |
|---|---|---|---|---|
| 5,530,852 A | | 6/1996 | Meske et al. ............... | 395/600 |
| 5,708,826 A | | 1/1998 | Ikeda et al. ................ | 395/762 |
| 5,752,836 A | | 5/1998 | Clark et al. ................ | 434/322 |
| 6,250,930 B1 | | 6/2001 | Mintz ......................... | 434/323 |
| 6,704,772 B1 | * | 3/2004 | Ahmed et al. .............. | 709/207 |
| 6,826,596 B1 | * | 11/2004 | Suzuki ....................... | 709/206 |
| 2002/0032743 A1 | * | 3/2002 | Lee et al. ................... | 709/206 |
| 2002/0091772 A1 | * | 7/2002 | Yong .......................... | 709/206 |
| 2002/0178225 A1 | * | 11/2002 | Madenberg et al. ........ | 709/206 |
| 2004/0176081 A1 | * | 9/2004 | Bryham et al. ........... | 455/414.1 |

* cited by examiner

*Primary Examiner*—Moustafa M. Meky
(74) *Attorney, Agent, or Firm*—David R. Mims, Jr.; Robert V. Wilder (57) ABSTRACT

A method and implementing computer system are provided in which replies to originating electronic messages such as email are grouped together in a manner such that the replies may be selectively accessed and presented together with a reference to the originating message for viewing by the sender of the original message. In one embodiment, selected relevant portions of reply messages are extracted or copied from the reply messages and presented as a connected series of individual replies on a display screen which references the originating message. In another embodiment, icons or hypertext references are created and embedded in or otherwise associated with an originating message to enable a user to quickly access replies to an originating message by selecting one or more of the embedded icons or hypertext from the originating message. In another embodiment, a user is enabled to selectively display all replies to a highlighted or otherwise designated originating message, on a single display page, by selecting a "View Reply" function button on the user's electronic messaging or email application.

14 Claims, 8 Drawing Sheets

GROUPING ELECTRONIC REPLY MESSAGES

FIELD OF THE INVENTION

The present invention relates generally to information processing systems and more particularly to a methodology and implementation for enabling message reply management in electronic communication systems.

BACKGROUND OF THE INVENTION

Email has become an indispensable tool in today's business environment. The flexibility of email systems, therefore, directly affects the productivity of email users, and thus, business itself. Many if not most email messages are addressed to more than one recipient. In most cases it is expected that each recipient will provide a response to the originator of the message. This is easily done by selecting a "Reply" function button in the recipient's email application. However, when replies are returned to the originator of a message, the replies are returned individually and appear on the originator's system as separate messages which are most often separated by other messages that have been sent to the originator from other parties. Thus it is quite a tedious exercise for the originator of an email message to determine who has replied to the original message, and the substance of each of the replies. The originator generally has to search his in-basket to identify any incoming messages from those who have been addressed in an earlier email by the originator. The originator then has to open each incoming email to determine what the substance of the reply is, then close each reply to search for and open other replies. The originator cannot easily know who has replied and who has not replied to an earlier originator message at any point in time. Thus, an originator has to continually visually check the listing of incoming emails in the email in-basket to determine if any or all replies have been received.

Thus, there is a need for an improved methodology and system for enabling the control and management of replies to electronic messages.

SUMMARY OF THE INVENTION

A method and implementing computer system are provided in which replies to originating electronic messages such as email are grouped together in a manner such that the replies may be selectively accessed and presented together with a reference to the originating message for viewing by the sender of the original message. In one embodiment, selected relevant portions of reply messages are extracted or copied from the reply messages and presented as a connected series of individual replies on a display screen which references the originating message. In another embodiment, icons or hypertext references are created and embedded in or otherwise associated with an originating message to enable a user to quickly access replies to an originating message by selecting one or more of the embedded icons or hypertext from the originating message. In another embodiment, a user is enabled to selectively display all replies to a highlighted or otherwise designated originating message, on a single display page, by selecting a "View Reply" function button on the user's electronic messaging or email application.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

Figure 1:
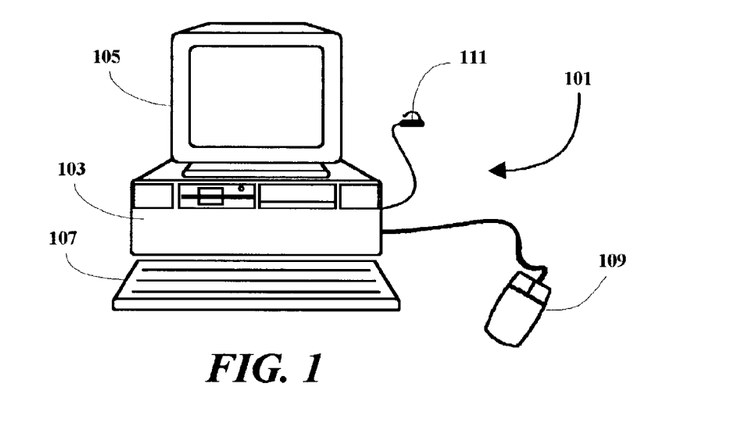
FIG. 1 is a computer system which may be used in an exemplary implementation of the present invention.

With reference to FIG. 1, the various methods discussed herein may be implemented within a computer network including a computer terminal 101, which may comprise either a workstation, personal computer (PC), laptop computer or a wireless computer system. In general, an implementing computer system may include any computer system and may be implemented with one or several processors in a wireless system or a hard-wired multi-bus system in a network of similar systems. Further, the methodologies herein disclosed may be implemented in a mail server and/or any personal information processing device capable of processing electronic messages.

In the FIG. 1 example, the computer system includes a processor unit 103 which is typically arranged for housing a processor circuit along with other component devices and subsystems of a computer terminal 101. The computer terminal 101 also includes a monitor unit 105, a keyboard 107 and a mouse or pointing device 109, which are all interconnected with the computer terminal illustrated. Other input devices such as a stylus, used with a menu-driven touch-sensitive display may also be used instead of a mouse device. Also shown is a connector 111 which is arranged for connecting a modem within the computer terminal to a communication line such as a telephone line in the present example. The computer terminal may also be hard-wired to an email server through other network servers and/or implemented in a cellular system as noted above.

Figure 2:
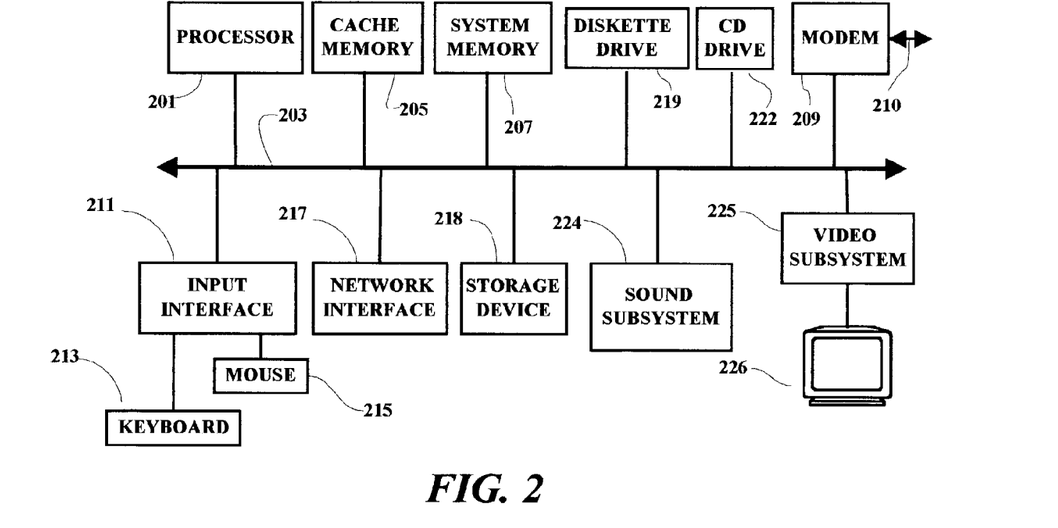
FIG. 2 is a schematic block diagram illustrating several of the major components of an exemplary computer system.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205 and a system memory unit 207 are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with network and/or email server through a network connection such as the Internet. The system bus 203 is also connected through an input interface circuit 211 to a keyboard 213 and a mouse or pointing device 215. The bus 203 may also be coupled through a hard-wired network interface subsystem 217 which may, in turn, be coupled through a wireless or hard-wired connection to a network of servers and mail servers on the world wide web. A diskette drive unit 219 and a CD drive unit 222 are also shown as being coupled to the bus 203. A video subsystem 225, which may include a graphics subsystem, is connected to a display device 226. A storage device 218, which may comprise a hard drive unit, is also coupled to the bus 203. The diskette drive unit 219 as well as the CD drive 222 provide a means by which individual diskette or CD programs may be loaded into memory or on to the hard drive, for selective execution by the computer terminal 101. As is well known, program diskettes and CDs containing application programs represented by magnetic indicia on the diskette or optical indicia on a CD, may be read from the diskette or CD drive into memory, and the computer system is selectively operable to read such magnetic or optical indicia and create program signals. Such program signals are selectively effective to cause the computer system to present displays on the screen of a display device and respond to user inputs in accordance with the functional flow of the application program.

The following description is provided with reference to an email system although it is understood that the invention applies equally well to any electronic messaging system including, but not limited to, wireless and/or cellular text messaging systems. Electronic mail is now an integral part of business and personal communications, and as such, the functionality, usability, and efficiency of email systems directly affect personal and corporate productivity.

Business professionals spend many hours reviewing email, and very often these messages are collaborative in nature, such that the sender will receive some sort of reply from those recipients to whom his original message was sent. This situation sets up several problems with respect to over all efficiency of email collaboration. The sender of a collaborative message must review and store multiple reply messages. For example, a manager may send out a lunch invitation to the manager's local team of 15 people, asking who could attend, and what each would like to eat. This originating message solicits fifteen (15) reply messages, each of which has to be opened, manually compiled, and stored for reference. This invention will allow for a much more efficient method whereby each reply message is related or associated to the original note, such that the sender need only reference a single note (for example by opening the original message or by highlighting the original message from a listing of "sent" messages) to see every response to the referenced original message.

In a first example, replies to an original message are actually embedded in the original message and, in addition, may be retained in, or entirely deleted from, original sender's "In-Basket". This process would occur at the receiving end at the user terminal, or at the user's email server or both. The note would be identified as a reply message using conventional, (chaining), methods and rather than simply create a thread or chain, the contents of the note would be parsed and the reply message appended into the bottom of the originating note, at which time the reply note itself could be automatically deleted. Additionally, the appending of data into the original note may cause the note to be flagged as unread.

If the originating note is deleted or attempted to be deleted prior to receipt of a reply(s), several options would be available, including but not limited to the following: The embedding function could be disabled upon deletion of the original resulting in current legacy behavior; the reply note could be "marked" or otherwise updated as an "unchained reply"; or a recovery of the original note could be initiated. Existing email application logic identifying all notes in the classes "reply" and "reply with history" is used to implement the new parsing function.

In the case of a "reply" note, all that will be necessary is capture of replying parties name, the time stamp, and the text response. In the case of a "reply with history", the text could be parsed in order to identify the "reply text", and strip out the original history text. Only the sender name, time stamp, and unique reply text need be captured for processing. It should be noted however, even in the case where all reply data are stored in the originating note, that storage space would be saved because although the originating note would be larger, meta-data and back-up/restore data would be required for a single note rather than multiple notes.

Figure 3:
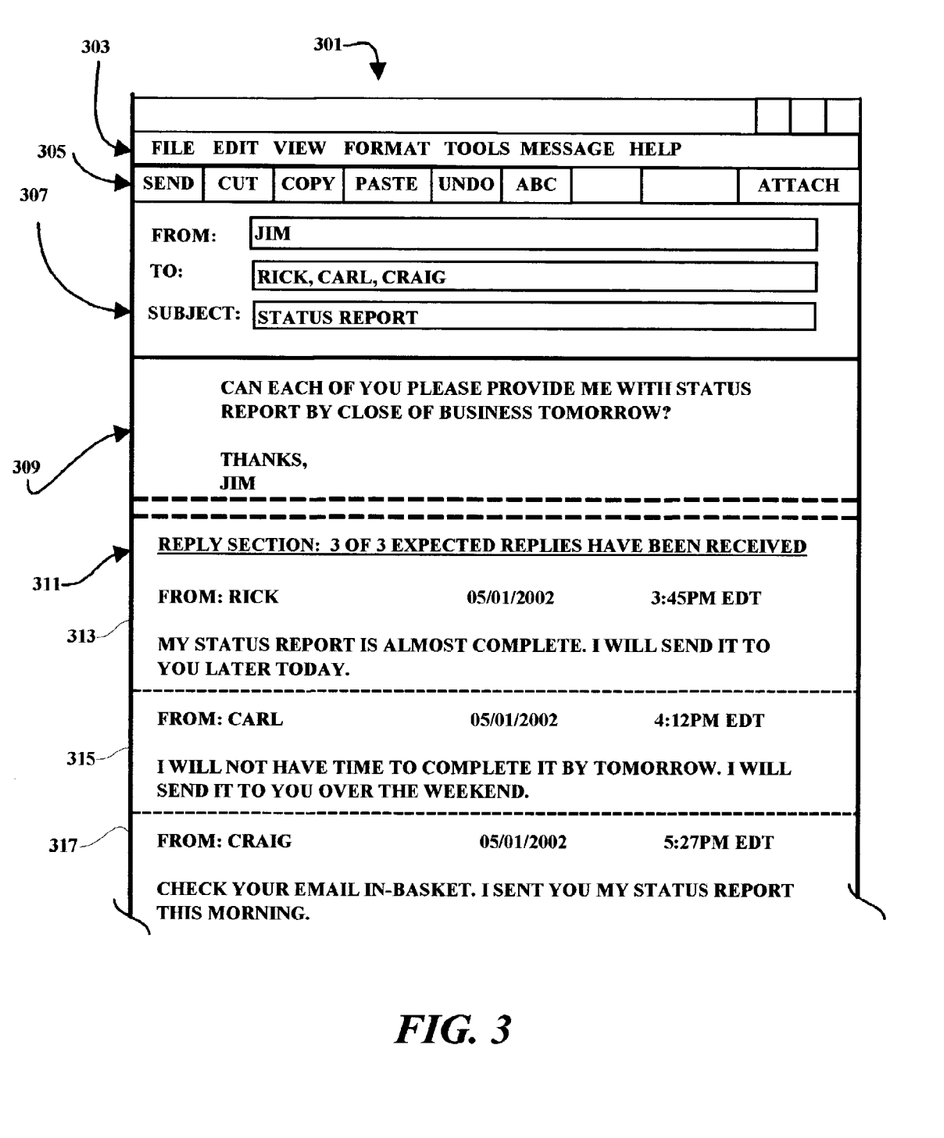
FIG. 3 is an illustration of an email screen or display which may be used in one exemplary embodiment of the present invention.

The above example is illustrated in FIG. 3 which shows a display screen 301 of an email application at a user terminal. As shown, the screen includes a function menu 303, an operational menu 305 and an address area 307 which includes the names of the sender and the names of the recipients of an originating message 309. In a reply section 311, which is appended to the original message 309, the received reply messages 313, 315 and 317 are presented. In this example, by displaying the originating message 309, a sender is able to view all of the responses or replies 313, 315 and 317 to the originating message. Also, the sender is able to see how many of the expected replies have been received at any time (i.e. "3 OF 3 EXPECTED REPLIES HAVE BEEN RECEIVED"). In another example, the replies to an originating message may be associated with a listing of "Sent" messages such that the replies would be presented when a user or sender highlights the originating message from a listing of messages which have been sent by the user.

Figure 4:
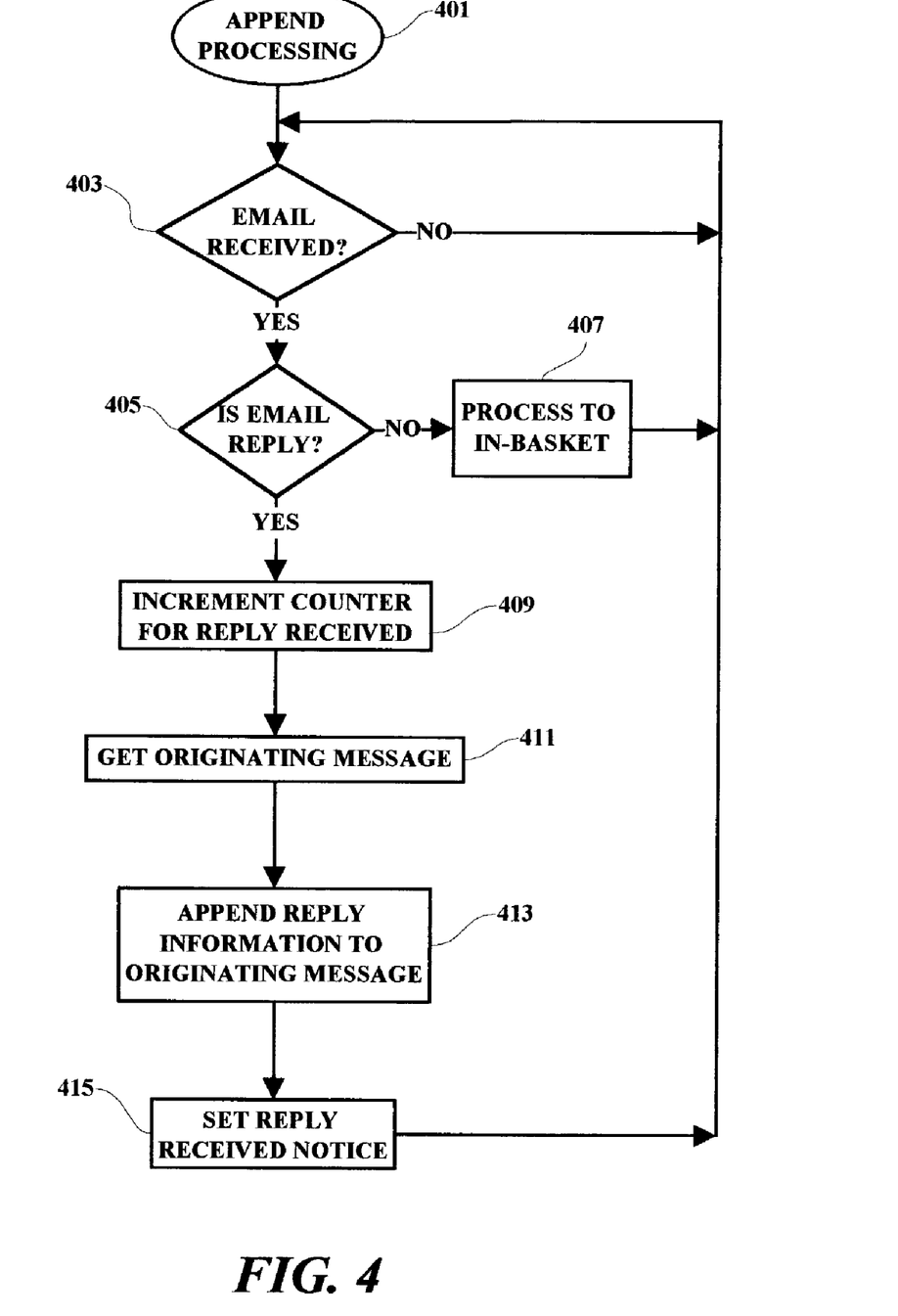
FIG. 4 is a flow chart illustrating an exemplary functional flow sequence which may be used in connection with the embodiment illustrated in FIG. 3.

In FIG. 4, there is shown an exemplary embodiment of the "Append Processing" flow sequence 401 which is effective to create the screen display shown in FIG. 3. Initially, it is determined that an email has been received 403 and that the received email is a reply 405 to an originating or sender's message. If the received email is not a reply, then the normal "in-basket" processing occurs 407. If the received email is a reply to an originating message 405 then a counter is incremented 409. The counter function enables the application to determine and display how many replies to an originating message have been received. Next, the originating message is retrieved 411 and the reply, or a predetermined portion of the received reply, is appended to the original message 413. At that time, a "reply received" notice or flag is set 415 so that a notice indicium, such as a flashing light, may be activated to alert a sender that a reply to one of his originating messages has been received. After the "reply received" notice has been set, the processing returns to await the next received email 403.

It is noted that additional code may be implemented to generate a "Warning" message in the event that a sender of an originating message attempts to delete the originating message from the sender's files. For example, if a sender tried to delete a sent message, a pop-up warning would state "You are about to delete a note which has pending reply messages. Removal of this message will result in loss of all replies". Another feature would include the coloring, for example, of reply text, which would be defaulted to black when the reply has been read by the originating sender. This would enable the user to quickly see previously read replies and newly received replies.

It is noted that in order to protect data integrity, once the original note has been sent, it could be set to "read only" mode. At this point, only the new "note management system" would be permitted write access to the note. Upon receipt of all replies, the note could become read only without exception. Additionally, the response data would be an independent logical entity such that if the originating note is resent or used to "reply with history", only the body of the note, and not the response data would be forwarded. Additionally, the exemplary implementation would cause this embedding to be legacy behavior in that the great majority of email messages are collaborative in nature. An option could be implemented to mark a note as "non collaborative", in which case reply embedding would not occur for the given note.

In another exemplary embodiment of the present invention, the replies would not be embedded into the original sender's message but rather, upon receipt of a reply note, an icon or hypertext reference is embedded in association with an original note. The icon or hypertext, when selected or activated by the original sender, is able to link to a specific reply for display to the originating sender. "Clicking" on a given icon with a mouse for example, would then cause that reply note to be opened. This could be accomplished using existing hyper-link methods, however, rather than linking note chains in a folder view, the reply links could all be directed back to the embedded icons in originating note. As in the previous embodiment, the icon could preexist the receipt of a reply note and change color with status change, or could be embedded only at the time of receipt. This method may be preferred when reply notes are expected to be lengthy, however, does not provide for the space saving accomplished with the previous method due to the requirement of maintaining the independent reply messages. It should be also noted that even without the space savings, this embodiment has value in that it provides the convenience of viewing reply status and accessing all replies from a central point, the originating note. Continuing to use the example note and replies above, the icon implant methodology is illustrated in FIG. 5.

Figure 5:
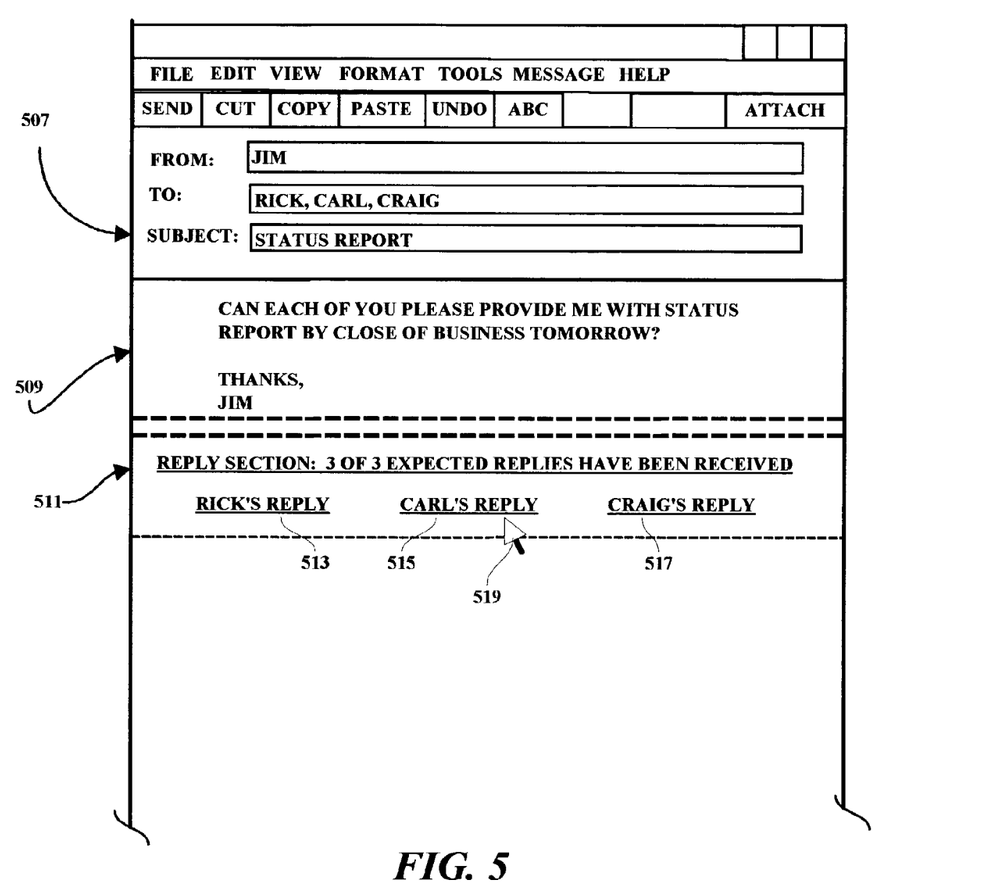
FIG. 5 is an illustration of an email screen or display which may be used in another exemplary embodiment of the present invention.

As shown in FIG. 5, an outgoing originating message is directed from a sender to a group of recipients 507. The text of the originating message is also illustrated 509. In a Reply Section 511, the number of replies is displayed together with a hypertext reference to each of the replies 513, 515 and 517. The originating sender may view any or all of the replies by pointing to and clicking upon the appropriate hypertext or icon 513, 515 or 517 using the mouse pointer 519.

Figure 6:
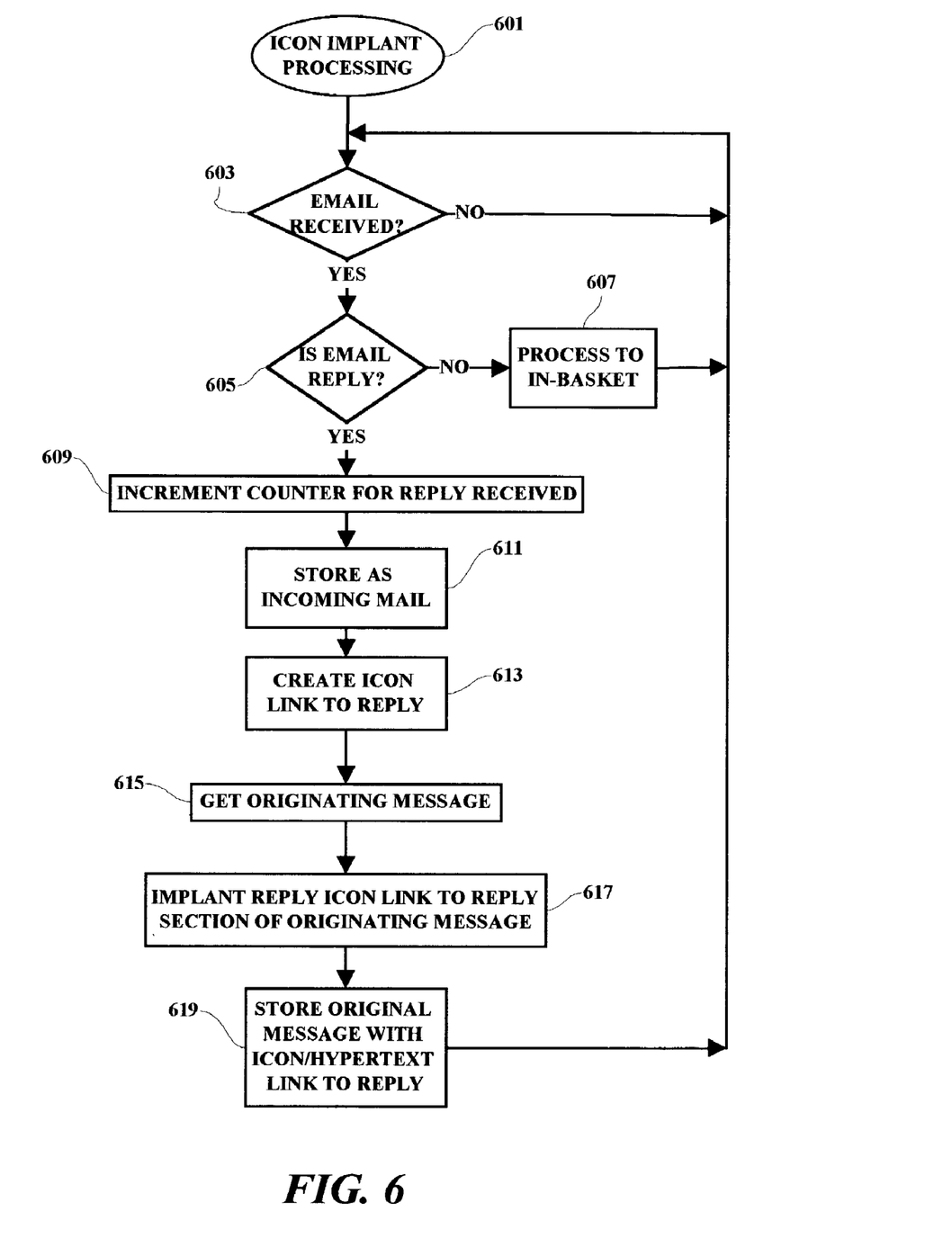
FIG. 6 is a flow chart illustrating an exemplary functional flow sequence which may be used in connection with the embodiment illustrated in FIG. 5.

An exemplary functional sequence which may be used to accomplish the "Icon Implant" features shown in FIG. 5 is illustrated in FIG. 6. As shown in FIG. 6, the processing begins 601 by detecting when an email is received 603. Next, if the received email is not a reply 605, normal in-basket processing 607 is accomplished. If, however, the received email is a reply 605 to a referenced originating email, then a reply message counter is incremented 609 and the received email is stored as incoming mail 611. An icon or hypertext reference is created 613 which is linked to the received reply. Next, the referenced originating message is fetched 615 and the reply message icon or hypertext is implanted or otherwise associated with the originating message. In the illustrated example, the reply icon is placed in a reply section of the originating message 617. The originating message, including the implanted reply icon, is then stored 619 and the processing returns to await the next received email 603. As an added feature, the icons or hypertext references could appear on the sender's display in a different color to indicate that the referenced replies have not yet been read, and the color of particular replies could change back to a default color, for example, after each particular reply has been read by the sender of the originating message. In this implementation, each of the reply notes would otherwise be managed in a legacy manner, the only difference being the insertion of the new hyperlink to the original note.

In a third example, the reply notes would be stored within the email system in a legacy manner, and a new tool-bar or pull-down menu option would be added to the application. No visible link would be present within the original note, however, each reply would be hyper-linked to the originating note. Accessing the new selection would cause activation of the hyper-links, (similar to an internet pop-up window), parsing and aggregation of the data, and result in a single read-only pop-up window displaying all currently received reply messages. Again with this embodiment various filtering and color options could be used for text management and status indication. Considering once again the ongoing example, an implementation of the "View Reply" function is illustrated in FIG. 7.

Figure 7:
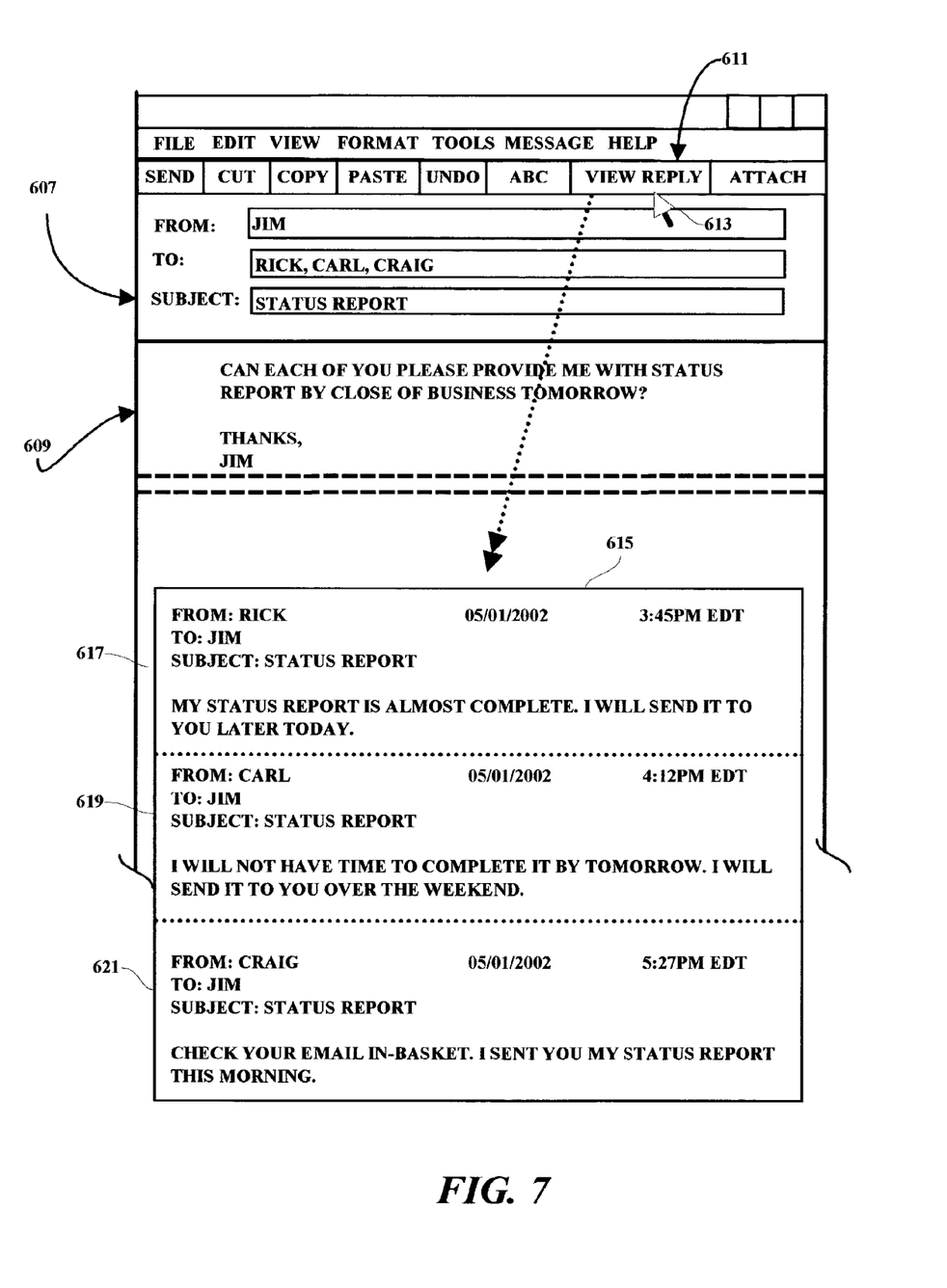
FIG. 7 is an illustration of an email screen or display which may be used in another exemplary embodiment of the present invention.

As shown in FIG. 7, an email application screen of a sender of an originating email is illustrated and includes address and message sections 607 and 609. In addition, a new "View Reply" function button 611 is implemented and when selected and actuated with a pointer 613, a pop-up window 615 appears on the user's screen. In the example, the View Reply function is executed from the sender's message screen so that the replies are tied to the message being displayed. This could also be implemented by highlighting a particular message from a listing in the user's "Sent Messages" listing. The pop-up window shows all of the replies 617, 619 and 621 which have been received in response to the referenced sender's originating message.

Figure 8:
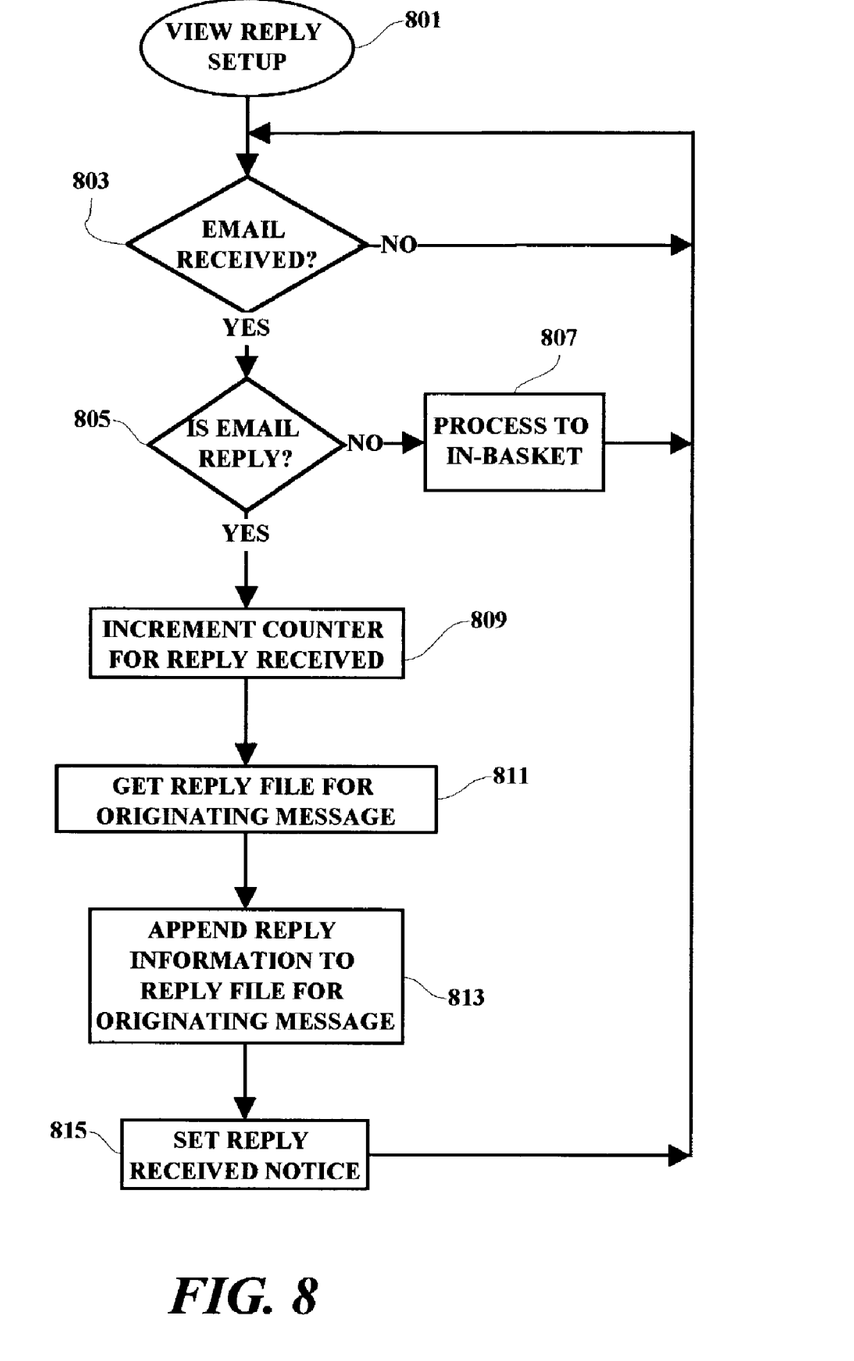
FIG. 8 is a flow chart illustrating an exemplary functional flow sequence which may be used in connection with the embodiment illustrated in FIG. 7.

An exemplary functional sequence which may be used to accomplish the "View Reply" function implementation shown in FIG. 7 is illustrated in FIG. 8. As shown in FIG. 8, the processing begins 801 by detecting when an email is received 803. Next, if the received email is not a reply 805, normal in-basket processing 607 is accomplished. If, however, the received email is a reply 805 to a referenced originating email, then a reply message counter is incremented 809 and a reply file for the referenced originating message 811 and the received reply, or selected portions, are appended to the reply file for the originating message. It is noted that in this example, nothing is embedded or implanted in the originating message. The originating message remains in tact as sent and a new file is created to contain all of the replies to each originating message. The replies are inserted or appended to the reply file for the originating message 813, a "reply received" flag or other notice is set 815 and the process returns to await the receipt of the next email 803.

Figure 9:
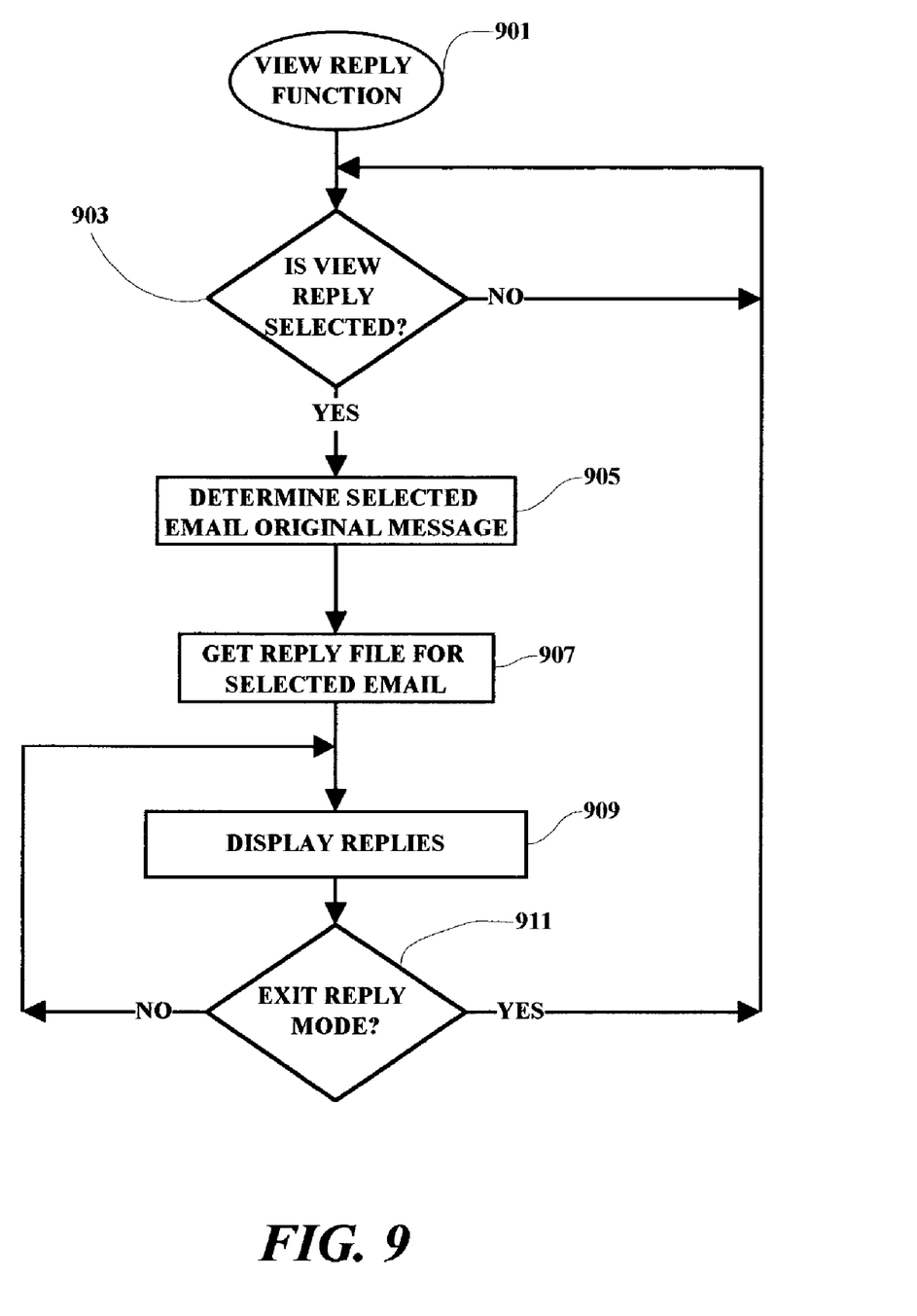
FIG. 9 is a flow chart illustrating a functional flow sequence which may be used in an exemplary implementation of the "View Reply" feature of the present invention.

An exemplary flow sequence for an execution of the View Reply function is illustrated in FIG. 9. As illustrated, when the process begins 901, it is determined that the View Reply function has been selected 903 by the user or sender of originating messages. The View Reply function is actuated with the referenced originating message being displayed so the process "knows" that the user wishes to view the replies to a particular originating message. This may also be accomplished from another screen in which case the user could be prompted to highlight or otherwise identify the particular originating message for which the user wishes to view the responses or replies. After it is determined what the originating message is 905, then the reply file for the selected originating message is retrieved 907 and the replies are displayed 909. In the example shown, the replies would continue to be displayed 909 until the user selects an exit function 911 at which time the processing will return to await the next actuation of the View Reply function button.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing replies received by a sender of an originating electronic message from a predetermined number of recipients of said originating electronic message, wherein said originating electronic message and said replies are email messages transmitted over a network, said method comprising:

receiving said replies;

associating each reply received to said originating electronic message;

counting a number of replies received to said originating electronic message from said recipients;

displaying at least a portion of said originating electronic message;

displaying said number of replies received and said predetermined number of said recipients of said originating electronic message;

enabling a display of at least a predetermined portion of each of said replies on a single screen display together with said portion of said originating electronic message; and creating an electronic link to each of said replies and inserting link indicia representing said electronic links into a display of said originating electronic message whereby said sender is enabled to determine when all of said predetermined number of replies have been received, and further enabling said sender to view selected ones of said received replies by selecting corresponding ones of said link indicia.

2. The method as set forth in claim 1 wherein said originating electronic message and said replies are text messages transmitted through a wireless communication device.

3. The method as set forth in claim 2 wherein said wireless communication device is a cellular telephone.

4. The method as set forth in claim 1 wherein said replies are appended sequentially to said originating electronic message.

5. The method as set forth in claim 4 wherein said originating electronic message is displayed together with said predetermined portion of said replies on said single screen display.

6. The method as set forth in claim 1 wherein said link indicia comprise hypertext links identifying different ones of said replies.

7. The method as set forth in claim 1 wherein said link indicia comprise icon indicia.

8. The method as set forth in claim 1 wherein said displayed reference to said originating electronic message includes a full text of said originating electronic message.

9. The method as set forth in claim 1 wherein said displayed reference to said originating electronic message comprises an identification of said originating electronic message from a listing which includes identifications of other electronic messages sent by said sender.

10. The method as set forth in claim 1 wherein said enabling is accomplished by a user selection of a view reply function indicium displayed on a display screen which includes said displayed reference to said originating electronic message.

11. The method as set forth in claim 1 wherein said replies are displayed having a first displayed characteristic prior to viewing, said replies having a second display characteristic after being viewed by said sender.

12. The method as set forth in claim 11 wherein said first characteristic is a first color and said second characteristic is a second color.

13. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to enable processing replies received by a sender of an originating electronic message from a predetermined number of recipients of said originating electronic message, wherein said originating electronic message and said replies are email messages transmitted over a network, said program signals being selectively operable to accomplish the steps of:

receiving said replies;

associating each reply received to said originating electronic message;

counting a number of replies received to said originating electronic message from said recipients;

displaying at least a portion of said originating electronic message;

displaying said number of replies received and said predetermined number of said recipients of said originating electronic message;

enabling a display of at least a predetermined portion of each of said replies on a single screen display together with said portion of said originating electronic message; and creating an electronic link to each of said replies and inserting link indicia representing said electronic links into a display of said originating electronic message whereby said sender is enabled to determine when all of said predetermined number of replies have been received, and further enabling said sender to view selected ones of said received replies by selecting corresponding ones of said link indicia.

14. A computer system comprising:

a system bus selectively connectable to a electronic communication network;

a CPU device connected to said system bus;

a memory device connected to said system bus;

a user input device connected to said system bus; and a display device connected to said system bus, said computer system being selectively operable for processing replies received by a sender of an originating electronic message from a predetermined number of recipients of said originating electronic message, wherein said originating electronic message and said replies are email messages transmitted over a network, said computer system being further selectively operable to accomplish the steps of:

receiving said replies;

associating each reply received to said originating electronic message;

counting a number of replies received to said originating electronic message from said recipients;

displaying at least a portion of said originating electronic message;

displaying said number of replies received and said predetermined number of said recipients of said originating electronic message;

enabling a display of at least a predetermined portion of each of said replies on a single screen display together with said portion of said originating electronic message; and creating an electronic link to each of said replies and inserting link indicia representing said electronic links into a display of said originating electronic message whereby said sender is enabled to determine when all of said predetermined number of replies have been received, and further enabling said sender to view selected ones of said received replies by selecting corresponding ones of said link indicia.

* * * * *